(12) United States Patent
Haut et al.

(10) Patent No.: US 10,479,391 B2
(45) Date of Patent: Nov. 19, 2019

(54) CHILD STROLLER APPARATUS

(71) Applicant: Wonderland Switzerland AG, Steinhausen (CH)

(72) Inventors: Robert E. Haut, Merion Station, PA (US); Andrew J. Taylor, Mohnton, PA (US)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

(21) Appl. No.: 15/963,671

(22) Filed: Apr. 26, 2018

(65) Prior Publication Data

US 2018/0312187 A1 Nov. 1, 2018

Related U.S. Application Data

(60) Provisional application No. 62/490,318, filed on Apr. 26, 2017.

(51) Int. Cl.
*B62B 9/12* (2006.01)
*B62B 7/06* (2006.01)
(Continued)

(52) U.S. Cl.
CPC .............. *B62B 9/12* (2013.01); *B62B 7/008* (2013.01); *B62B 7/062* (2013.01); *B62B 7/064* (2013.01);
(Continued)

(58) Field of Classification Search
CPC .. B62B 9/12; B62B 9/28; B62B 7/142; B62B 7/008; B62B 7/06–062; B62B 7/08;
(Continued)

(56) References Cited

U.S. PATENT DOCUMENTS

| | | | |
|---|---|---|---|
| 2008/0088116 A1* | 4/2008 | Den Boer | B62B 7/062 280/650 |
| 2014/0064829 A1* | 3/2014 | Li | B62B 7/08 403/81 |
| 2017/0297600 A1* | 10/2017 | Zhong | B62B 7/083 |

FOREIGN PATENT DOCUMENTS

| | | |
|---|---|---|
| DE | 102010037506 A1 | 3/2012 |
| EP | 2011717 A1 | 1/2009 |

(Continued)

OTHER PUBLICATIONS

The Sep. 21, 2018 Search Report from co-pending EP Patent Application No. 18169541.2.

*Primary Examiner* — Erez Gurari
(74) *Attorney, Agent, or Firm* — NZ Carr Law Office (57) ABSTRACT

A child stroller apparatus includes a first side segment connected fixedly with a first shell portion and a grip portion that are disposed adjacent to each other, a second side segment fixedly connected with a second shell portion that is pivotally connected with the first shell portion, a latch assembled in a cavity delimited at least partially by the first and second shell portions, the latch being movable between a locking position that prevents relative rotation between the first and second side segments and thereby locks the child stroller apparatus in an unfolded state for use, and an unlocking position for folding and unfolding of the child stroller apparatus, and a release actuator assembled adjacent to the grip portion and operatively coupled to the latch, the release actuator being operable to cause the latch to move from the locking position to the unlocking position.

25 Claims, 10 Drawing Sheets

(51) Int. Cl.
    *B62B 7/08*         (2006.01)
    *B62B 7/10*         (2006.01)
    *B62B 7/00*         (2006.01)
    *B62B 7/14*         (2006.01)
    *B62B 9/28*         (2006.01)

(52) U.S. Cl.
    CPC .................. *B62B 7/08* (2013.01); *B62B 7/10* (2013.01); *B62B 7/142* (2013.01); *B62B 9/28* (2013.01); *B62B 2205/003* (2013.01); *B62B 2205/24* (2013.01)

(58) Field of Classification Search
    CPC ....... B62B 7/064; B62B 7/10; B62B 2205/24; B62B 2205/003
    See application file for complete search history.

(56) References Cited

FOREIGN PATENT DOCUMENTS

| | | |
|---|---|---|
| EP | 2965969 A1 | 1/2016 |
| EP | 2990298 A2 | 3/2016 |

\* cited by examiner

CHILD STROLLER APPARATUS

CROSS-REFERENCE TO RELATED APPLICATION(S)

This application claims priority to U.S. Provisional Patent Application No. 62/490,318 filed on Apr. 26, 2017, the disclosure of which is incorporated herein by reference.

BACKGROUND

1. Field of the Invention

The present invention relates to child stroller apparatuses.

2. Description of the Related Art

Caregivers usually rely on a stroller apparatus to transport babies and children. A stroller apparatus is typically constructed from a metal frame that comprises the assembly of metal and plastic parts, and a fabric element that connects or wraps around the metal frame. When it is unused, the stroller apparatus can be collapsed for convenient storage or transport. The construction adopted for the folding mechanism of the stroller apparatus plays an important role in the design of the stroller since it has to be safe and convenient to handle in different situations while not affecting the appealing aesthetics of the stroller.

In some existing products, the stroller frame may typically include a front leg and a rear leg pivotally connected with each other, a handle frame pivotally connected with the front leg, and a latch mechanism that can lock the stroller frame in an unfolded state for use. However, the release member for the latch mechanism is often placed at a central location in the stroller frame, which may not be easy to access and may be inconvenient to operate when a caregiver needs to hold a baby with one hand while folding the stroller with the other hand.

Therefore, there is a need for a child stroller apparatus that can be convenient to fold and unfold, and address at least the foregoing issues.

SUMMARY

The present application describes a child stroller apparatus that is convenient to operate with one hand for folding and unfolding. The child stroller apparatus includes a first side segment connected fixedly with a first shell portion and a grip portion that are disposed adjacent to each other, a second side segment fixedly connected with a second shell portion that is pivotally connected with the first shell portion, a latch assembled in a cavity delimited at least partially by the first and second shell portions, the latch being movable between a locking position that prevents relative rotation between the first and second side segments and thereby locks the child stroller apparatus in an unfolded state for use, and an unlocking position for folding and unfolding of the child stroller apparatus, and a release actuator assembled adjacent to the grip portion and operatively coupled to the latch, the release actuator being operable to cause the latch to move from the locking position to the unlocking position.

DETAILED DESCRIPTION OF THE EMBODIMENTS

Figure 1:
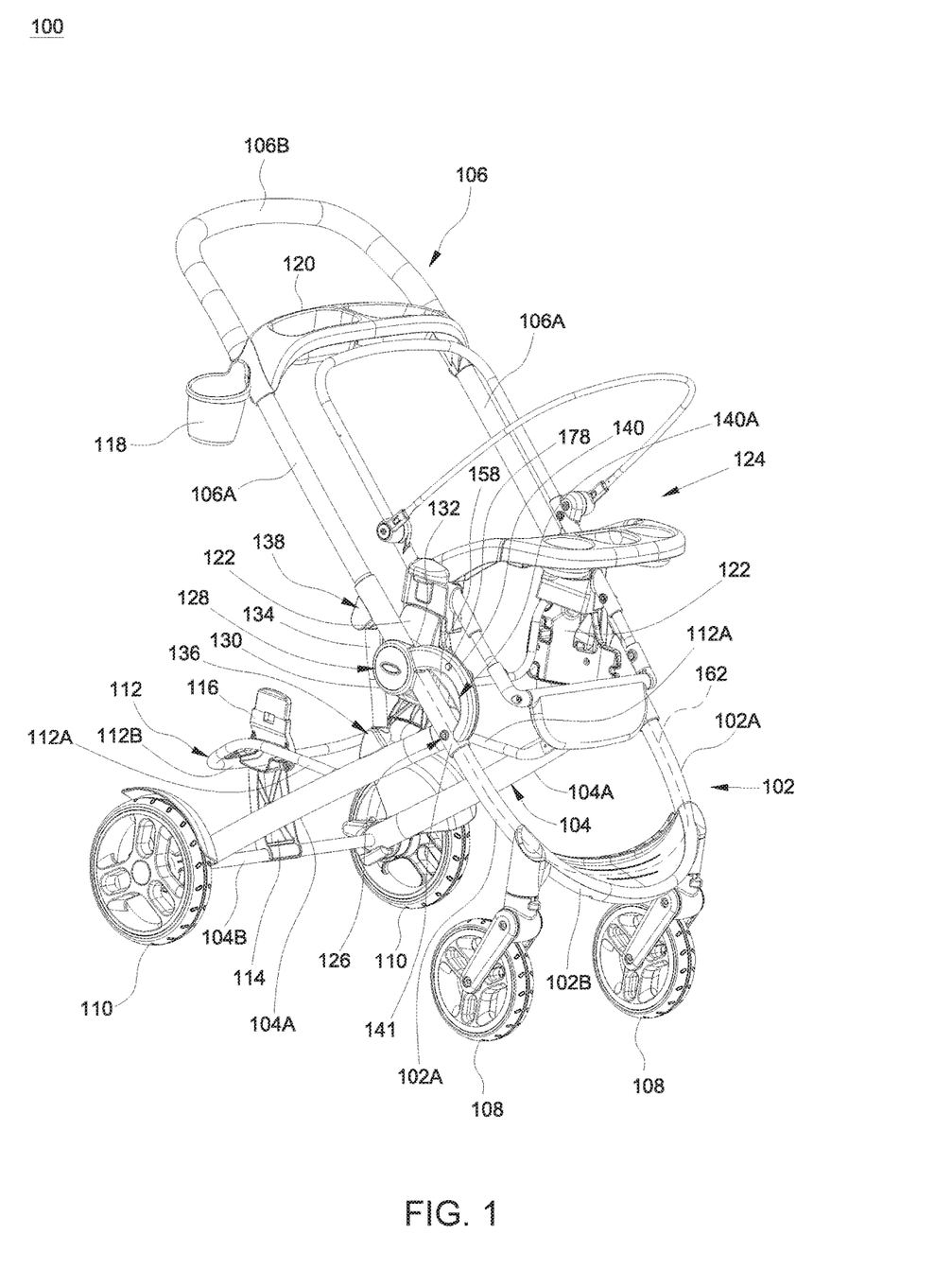
FIG. 1 is a perspective view illustrating an embodiment of a child stroller apparatus in an unfolded state.
Figure 2:
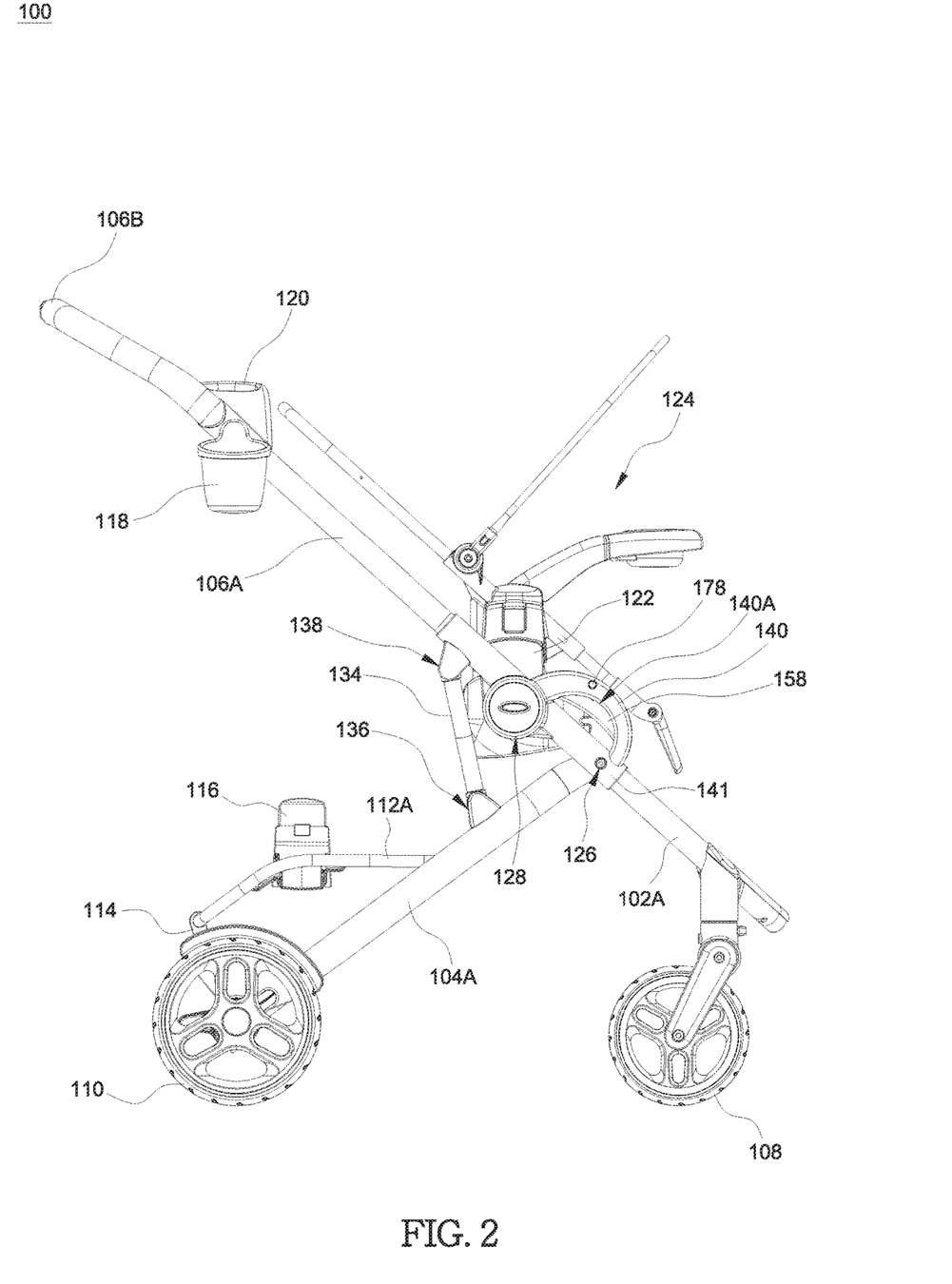
FIG. 2 is a side view of the child stroller apparatus in the unfolded state.
Figure 3:
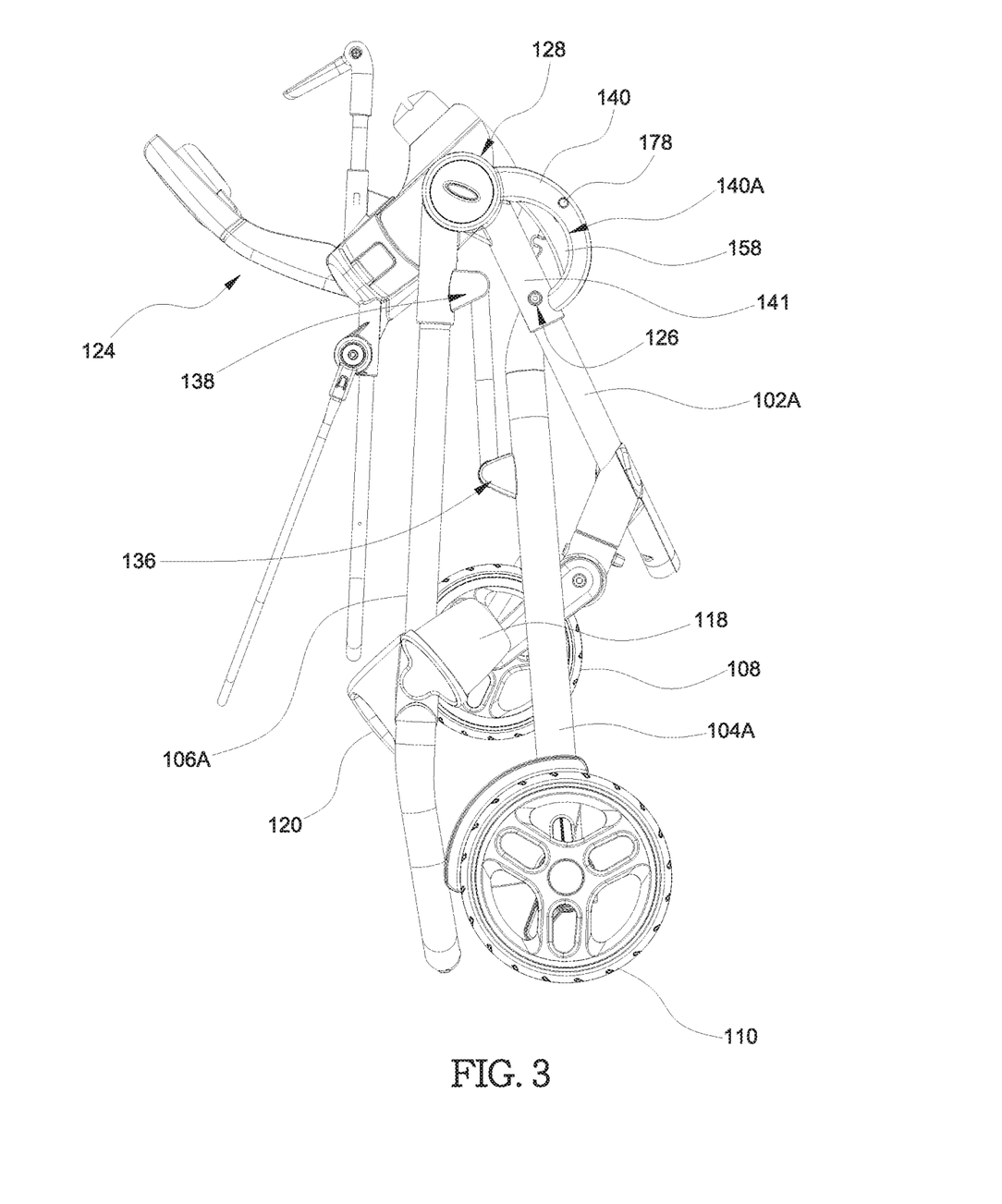
FIG. 3 is a side view illustrating the child stroller apparatus in a folded state.

FIG. 1 is a perspective view illustrating an embodiment of a child stroller apparatus 100 in an unfolded state, FIG. 2 is a side view of the child stroller apparatus 100 in the unfolded state, and FIG. 3 is a side view illustrating the child stroller apparatus 100 in a folded state. Referring to FIGS. 1-3, the child stroller apparatus 100 can include a front leg frame 102, a rear leg frame 104 and a push handle frame 106. According to an example of construction, the front leg frame 102, rear leg frame 104 and push handle frame 106 may be formed by tubular structures. The front leg frame 102 can include two side segments 102A respectively disposed at a left and a right side of the child stroller apparatus 100, and a transversal portion 102B connected with the two side segments 102A. The front leg frame 102 comprised of the two side segments 102A and the transversal portion 102B may be made of rigid materials, which may include, without limitation, metallic materials, rigid plastics, and the like. A lower portion of the front leg frame 102 can be provided with a plurality of wheel assemblies 108.

The rear leg frame 104 can include two side segments 104A respectively disposed at a left and a right side of the child stroller apparatus 100, and a transversal segment 104B connected with the two side segments 104A. The rear leg frame 104 comprised of the two side segments 104A and the transversal segment 104B may be made of rigid materials, which may include, without limitation, metallic materials, rigid plastics, and the like. A lower portion of the rear leg frame 104 can be provided with a plurality of wheel assemblies 110. Moreover, the rear leg frame 104 can further be connected with a rear support frame 112 adapted to provide support for a detachable child seat. According to an example of construction, the rear support frame 112 may have a generally U-shape including two side segments 112A respectively connected with the two side segments 104A of the rear leg frame 104, and a transversal segment 112B connected with the two side segments 112A. The rear support frame 112, including the two side segments 112A and the transversal segment 112B, may be formed as an unitary part. A bracket 114 may be respectively connected with the transversal segment 112B of the rear support frame 112 and the transversal segment 104B of the rear leg frame 104 to provide further support for the rear support frame 112. Two adapters 116 may be respectively provided on the two side segments 112A of the rear support frame 112 for installation of a detachable component (not shown) thereon. Examples of detachable components that may be engaged with the adapters 116 may include, without limitation, detachable child seats.

The push handle frame 106 can include two side segments 106A respectively disposed at a left and a right side of the child stroller apparatus 100, and a transversal segment 106B connected with the two side segments 106A. The push handle frame 106 comprised of the two side segments 106A and the transversal segment 106B may be made of rigid materials, which may include, without limitation, metallic materials, rigid plastics, and the like. A cup holder 118 and a tray 120 may be connected with the side segments 106A at an elevated position for an adult's use. Moreover, two adapters 122 may be respectively assembled with the two side segments 106A for installation of a detachable component. For example, referring to FIGS. 1 and 2, the two adapters 122 may be adapted to receive the installation of a detachable stroller seat 124.

At each of the left and right side of the child stroller apparatus 100, a same assembly structure is applied for connecting the front leg frame 102, the rear leg frame 104 and the push handle frame 106. More specifically, an upper end of the side segment 104A is pivotally connected with the corresponding side segment 102A via a pivot connection 126, whereby the front leg frame 102 and the rear leg frame 104 are rotatable relative to each other about the pivot connections 126. Each pivot connection 126 can include, e.g., a pivot shaft assembled through the side segments 102A and/or 104A. The side segment 102A of the front leg frame 102 can be pivotally connected with the corresponding side segment 106A of the push handle frame 106 via a pivot connection 128, whereby the front leg frame 102 and the push handle frame 106 are rotatable relative to each other about the pivot connections 128.

The pivot connection 128 can form a central articulation of the child stroller apparatus 100 about which a folding rotation of the push handle frame 106 can be initiated by gravity action for facilitating folding the child stroller apparatus 100. According to an embodiment, each pivot connection 128 includes a shell portion 130 fixedly connected with the side segment 102A of the front leg frame 102, and another shell portion 132 fixedly connected with the side segment 106A of the push handle frame 106 that is pivotally connected with the shell portion 130. Moreover, each of the left and right side of the child stroller apparatus 100 respectively includes a linking bar 134, which is respectively connected pivotally with the side segment 104A of the rear leg frame 104 and the side segment 106A of the push handle frame 106 via two pivot connections 136 and 138. In this manner, the rear leg frame 104 and the push handle frame 106 can be movably coupled to each other for facilitating folding and unfolding of the child stroller apparatus 100.

The child stroller apparatus 100 can be unfolded for use, and folded into a compact form for facilitating storage and transport. In the unfolded state, as shown in FIGS. 1 and 2, the pivot connection 128 comprised of the shell portions 130 and 132 is located above the pivot connection 126 and below the pivot connection 138, and the pivot connection 136 is located below the pivot connection 126. Moreover, the pivot connections 126, 136 and 138 can form three apexes of a triangle with the pivot connection 128 located adjacent to the side of the triangle joining the respective apexes of the pivot connections 126 and 138. While the child stroller apparatus 100 is in the unfolded state, the adapters 116 and/or 122 may respectively receive the installation of a detachable child seat.

In the folded state, as shown in FIG. 3, the front leg frame 102, the rear leg frame 104 and the push handle frame 106 may be collapsed into a compact form with the pivot connections 126 and 138 being located vertically between the pivot connections 136 and 128.

Referring to FIGS. 1-3, the child stroller apparatus 100 further includes a grip portion 140 for facilitating operation of the child stroller apparatus 100 with one hand. For example, the outer shape of the grip portion 140 can define at least partially a concavity 140A for facilitating grasping with one hand. The grip portion 140 is made of a rigid material, which can include, without limitation, rigid plastics, metal, and the like. The grip portion 140 is disposed adjacent to the shell portion 130, and extends below the shell portion 130. For example, the grip portion 140 can have a curved outer shape with two ends respectively adjacent to the shell portion 130 and the pivot connection 126 coupling the side segment 102A to the side segment 104A, the grip portion 140 protruding forward from the shell portion 130 and the side segment 102A.

According to an example of construction, the shell portion 130 and the grip portion 140 can be respectively connected fixedly with a sleeve 141, the shell portion 130 being disposed at an end of the sleeve 141 and the grip portion 140 having two ends respectively connected with the shell portion 130 and the sleeve 141. The shell portion 130, the grip portion 140 and the sleeve 141 can form a unitary part that can be fixedly connected with the side segment 102A by fastening the side segment 102A through the sleeve 141, the shell portion 130 and the grip portion 140 being thereby fixedly connected with the side segment 102A. The grip portion 140 can be easily accessible, and provide convenient holding for lifting the child stroller apparatus 100 above a floor surface with one hand during folding operation.

According to an embodiment, one grip portion 140 may be provided on the side segment 102A of the front leg frame 102 at one of the left and right sides of the child stroller apparatus 100. According to another embodiment, the child stroller apparatus 100 may include two similar grip portions 140, which may be fixedly connected with the two side segments 102A of the front leg frame 102 at both the left and right sides.

Figure 4:
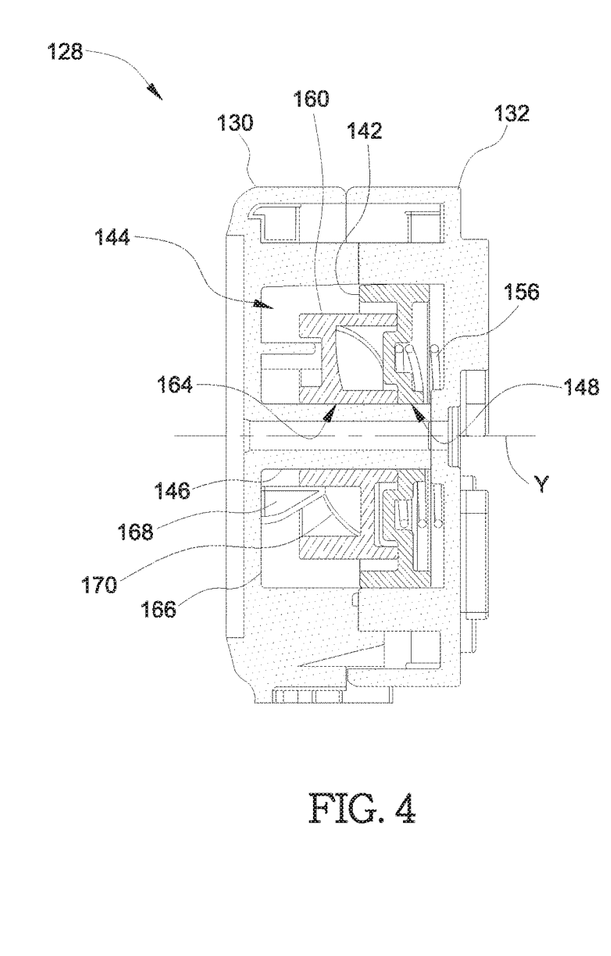
FIGS. 4 and 5 are schematic cross-sectional views illustrating some construction details of a latch mechanism and a release mechanism provided inside a pivot connection that couples a front leg frame to a push handle frame of the child stroller apparatus.
Figure 5:
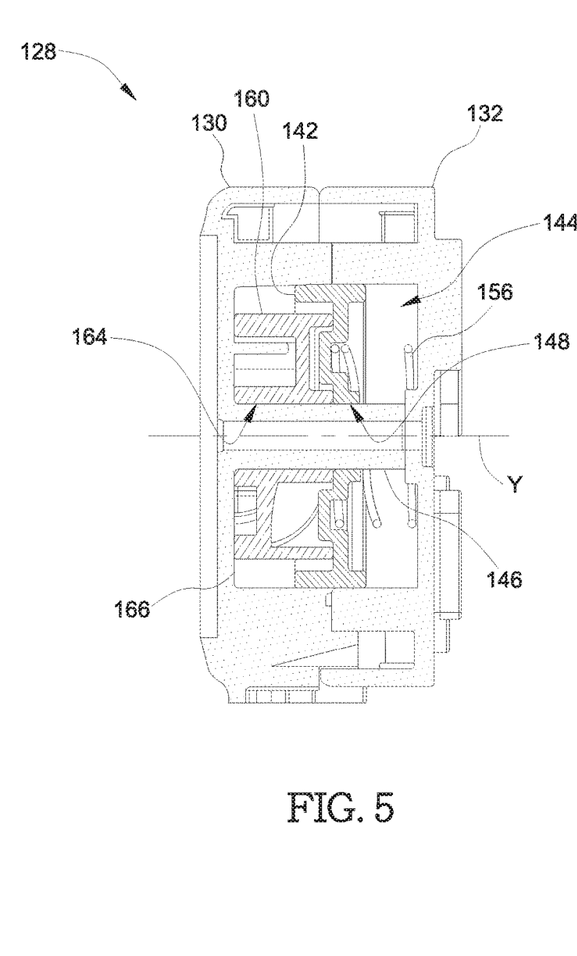
Figure 6:
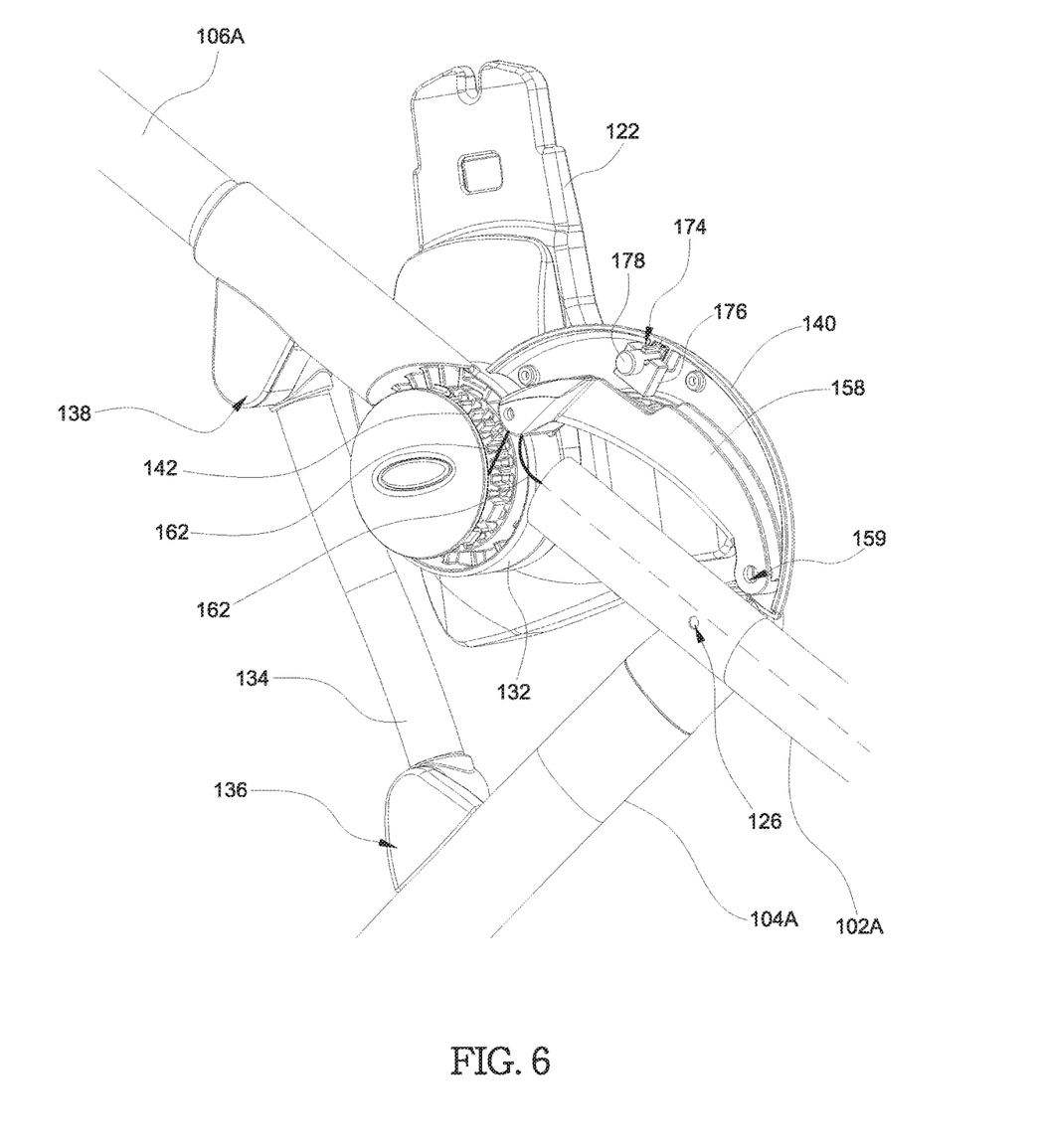
FIGS. 6 and 7 are perspective views respectively omitting some portions at two opposite sides of the pivot connection to better illustrate further construction details provided therein.
Figure 7:
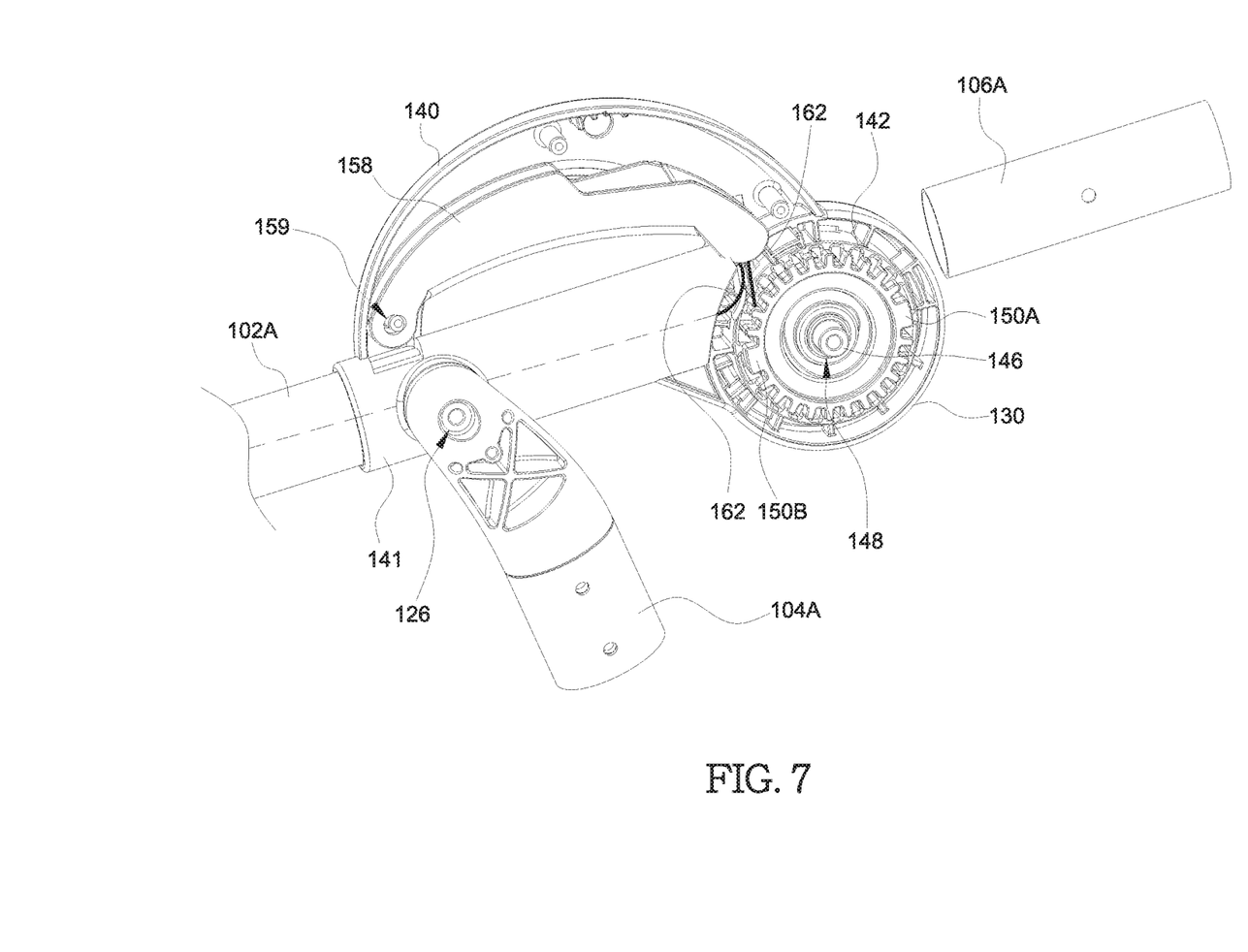
Figure 8:
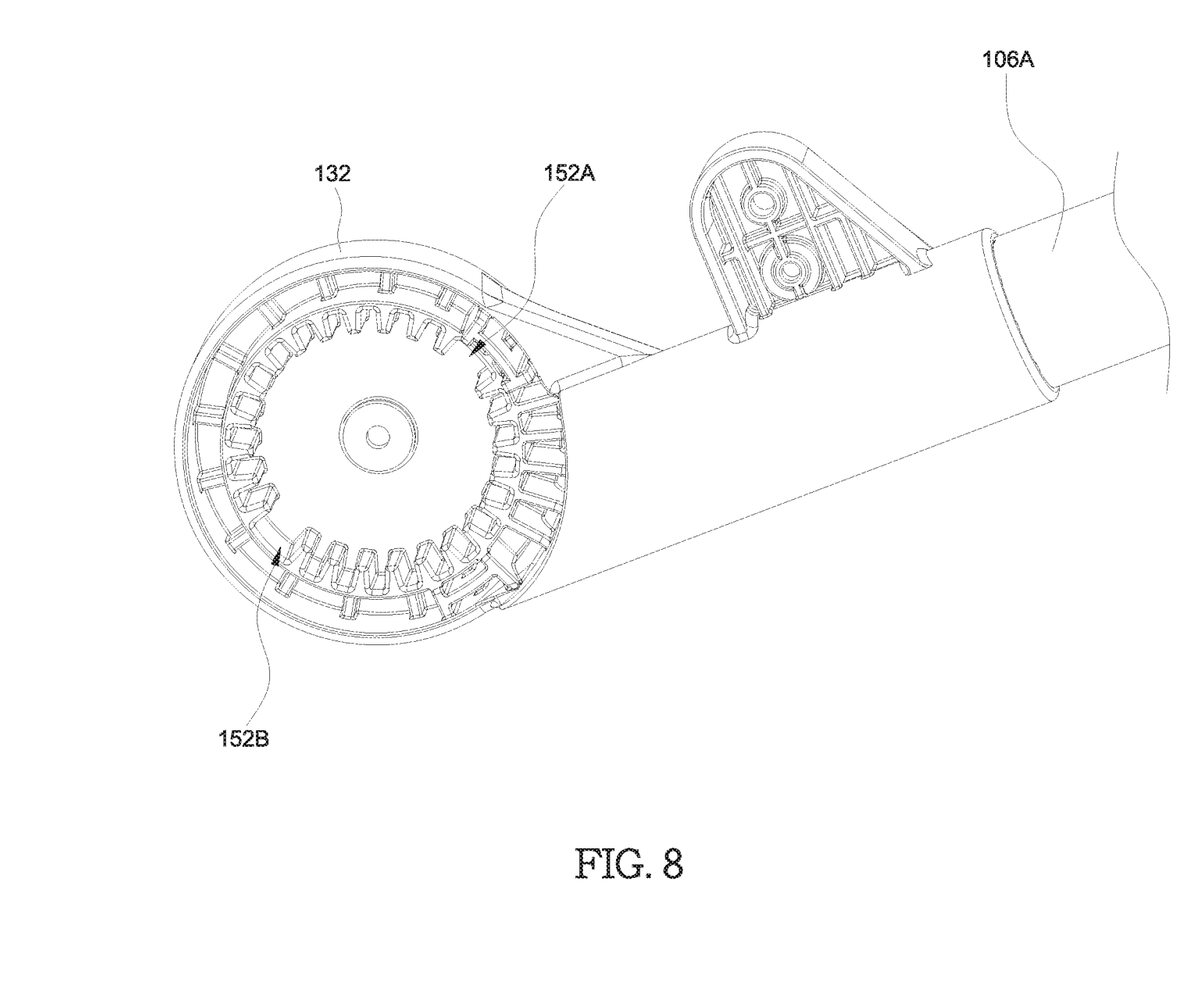
FIG. 8 is a perspective view showing an interior of one of the two shell portion that is fixedly connected with the push handle frame.
Figure 9:
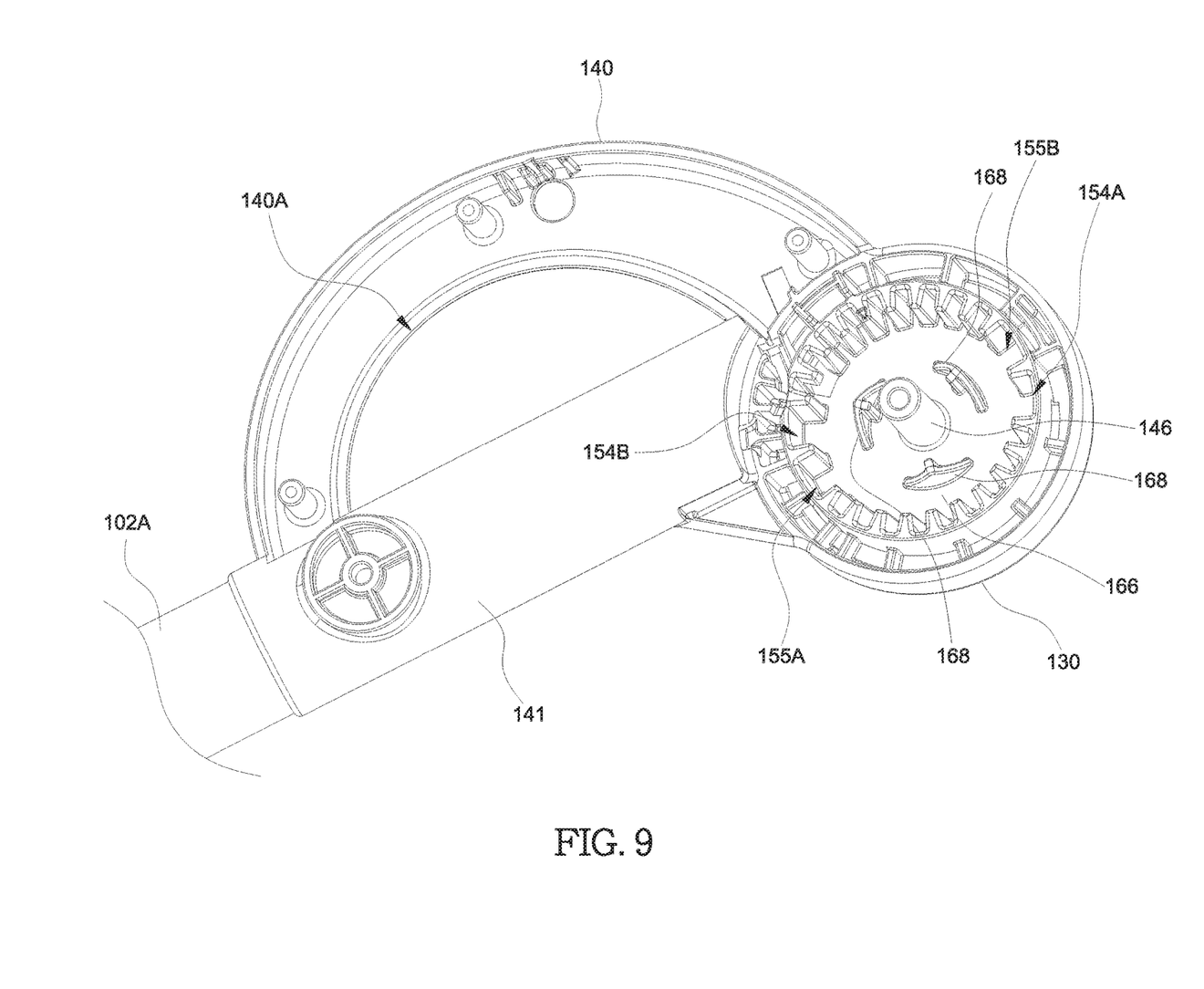
FIG. 9 is a perspective view showing an interior of the other shell portion that is fixedly connected with the front leg frame.

In conjunction with FIGS. 1-3, FIGS. 4-9 are schematic views illustrating construction details of a latch mechanism for locking the child stroller apparatus 100 in the unfolded state and the folded state, and construction details of a release mechanism for switching the latch mechanism to an unlocked state. More specifically, FIGS. 4 and 5 are schematic cross-sectional view illustrating some construction details of the latch mechanism and the release mechanism inside the pivot connection 128. FIG. 6 is a perspective view omitting some portions of the shell portion 130 and grip portion 140 so as to better illustrate further construction details provided therein. FIG. 7 is a perspective view omitting some portions of the shell portion 132 and grip portion 140 so as to better illustrate further construction details provided therein. FIG. 8 is a perspective view showing an interior of the shell portion 132. FIG. 9 is a perspective view showing an interior of the shell portion 130.

Referring to FIGS. 4-8, a latch 142 is assembled in a cavity 144 delimited at least partially by the two shell portions 130 and 132. The latch 142 is movable between a locking position where it can rotationally lock the shell portion 132 and the push handle frame 106 with respect to the shell portion 130 and the front leg frame 102 for locking the child stroller apparatus 100 in the unfolded state or the folded state, and an unlocking position allowing rotation of the shell portion 132 and the push handle frame 106 relative to the shell portion 130 and the front leg frame 102 for folding and unfolding of the child stroller apparatus 100.

According to an example of construction, the latch 142 may be slidably supported by a central post 146 that is fixedly connected with the shell portion 130. For example, the central post 146 may extend through a hole 148 provided in the latch 142. The shell portions 130 and 132 can be pivotally connected with each other about a pivot axis Y around which the push handle frame 106 is rotatable relative to the front leg frame 102, and the central post 146 can extend along the pivot axis Y. The latch 142 can thereby slide along the pivot axis Y between the locking position and the unlocking position. In the locking position, the latch 142 is engaged with the two shell portions 130 and 132 to prevent relative rotation between the two shell portions 130 and 132 and thereby lock the child stroller apparatus 100 in the unfolded state or the folded state. In the unlocking position, the latch 142 is disengaged from one of the two shell portions 130 and 132 (e.g., the shell portion 130) so as to allow relative rotation between the two shell portions 130 and 132 for folding or unfolding of the child stroller apparatus 100. FIG. 4 illustrates the latch 142 in the locking position, and FIG. 5 illustrates the latch 142 in the unlocking position.

Referring to FIGS. 4-9, the latch 142 includes a plurality of teeth that can engage with corresponding grooves provided in the two shell portions 130 and 132 to lock the child stroller apparatus 100 in the unfolded state and the folded state. For example, the latch 142 can include two teeth 150A and 150B disposed at a periphery of the latch 142. The two teeth 150A and 150B of the latch 142 are respectively received in two grooves 152A and 152B provided in the shell portion 132, and can engage with or disengage from multiple grooves 154A, 154B, 155A and 155B provided in the shell portion 130 at different radial directions relative to the central post 146. For example, the two teeth 150A and 150B can respectively engage with the two grooves 154A and 154B in the shell portion 130 to lock the child stroller apparatus 100 in the unfolded state, and respectively engage with the two grooves 155A and 155B in the shell portion 130 to lock the child stroller apparatus 100 in the folded state.

Referring to FIGS. 4 and 5, a spring 156 can be provided to bias the latch 142 toward the locking position. The spring 156 can be disposed around the central post 146 and the pivot axis Y, and can have two opposite ends respectively connected with the latch 142 and the shell portion 132.

As shown in FIGS. 1-3, 6 and 7, the child stroller apparatus 100 can further include a release actuator 158 operable to cause the latch 142 to move from the locking position to the unlocking position for folding and unfolding of the child stroller apparatus 100. The release actuator 158 can be assembled with the grip portion 140. To facilitate manual operation of the release actuator 158 while holding the grip portion 140, the release actuator 158 can be exposed in the concavity 140A of the grip portion 140.

Referring to FIGS. 4-7, the release actuator 158 is assembled adjacent to the grip portion 140, and is operatively coupled to the latch 142. According to an example of construction, the release actuator 158 is a single part, and is pivotally connected with the grip portion 140 via a pivot connection 159 which is adjacent to the pivot connection 126. The release actuator 158 may be configured so as to be rotatable relative to the grip portion 140 along a generally vertical plane. When the release actuator 158 is depressed, the release actuator 158 can move toward a hollow interior of the grip portion 140 and urge the latch 142 to move to the unlocking position. According to an embodiment, the release actuator 158 can be operatively coupled to the latch 142 via a driving member 160 and a cable 162.

Figure 10:
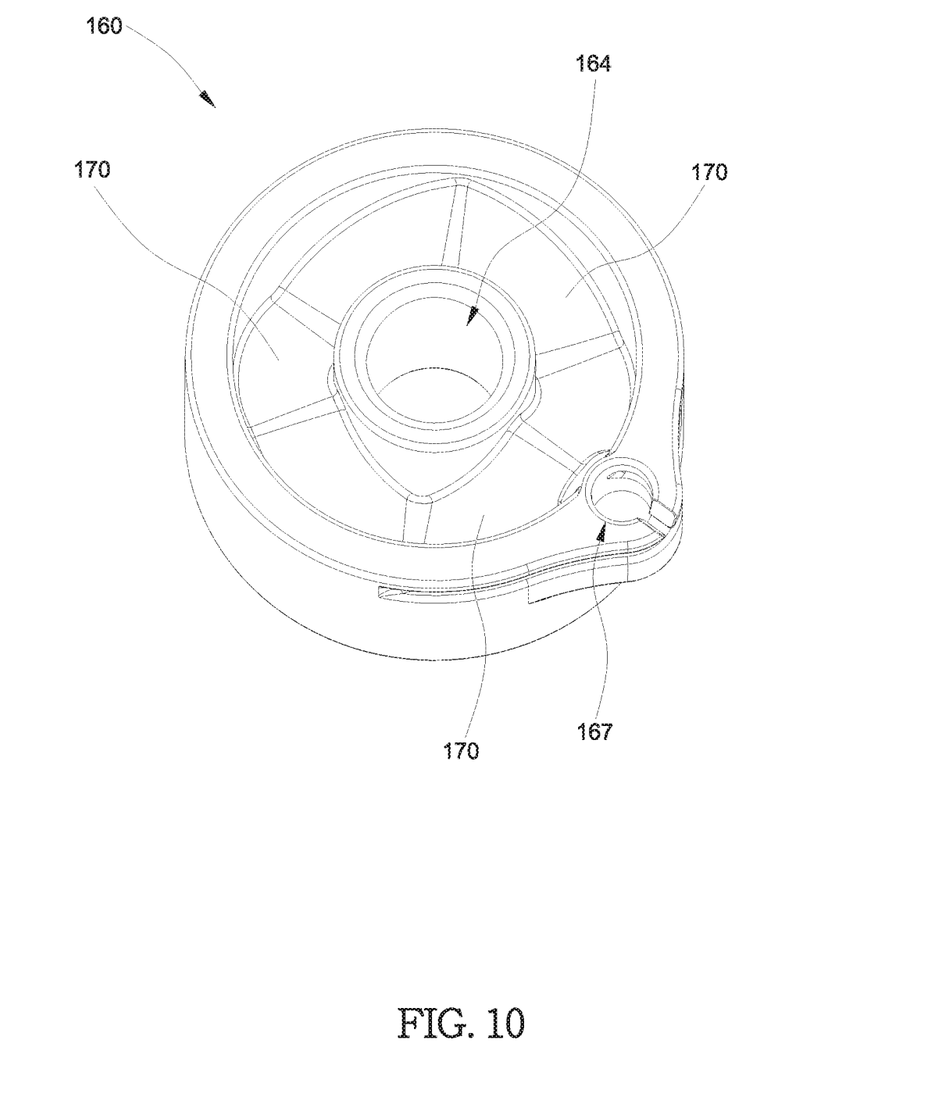
FIG. 10 is a perspective view illustrating a driving member used in the release mechanism.

FIG. 10 is a perspective view illustrating the driving member 160 alone. Referring to FIGS. 4-10, the driving member 160 can be disposed adjacent to the latch 142, and can be assembled around the central post 146. For example, the central post 146 can extend through a hole 164 provided in the driving member 160. The driving member 160 thereby can be pivotally and slidably supported by the central post 146 in a region of the cavity 144 between the latch 142 and a base surface 166 of the shell portion 130 from which the central post 146 protrudes.

The cable 162 can have two opposite ends respectively attached to the release actuator 158 and the driving member 160. For example, one end of the cable 162 can be attached to a distal end of the release actuator 158 distant from the pivot connection 159 that couples the release actuator 158 to the grip portion 140, and another end of the cable 162 can be attached to an anchor opening 167 provided in the driving member 160. When the release actuator 158 is depressed and rotates toward the hollow interior of the grip portion 140, the release actuator 158 can pull on the cable 162, which in turn urges the driving member 160 to rotate about the central post 146 and the pivot axis Y relative to the shell portion 130.

Referring to FIGS. 4, 5, 9 and 10, the base surface 166 of the shell portion 130 can have one or more rib 168 in sliding contact with one or more corresponding ramped surface 170 provided on the driving member 160. As the driving member 160 is driven in rotation by the release actuator 158, the sliding contact between the rib 168 and the ramped surface 170 can concurrently urge the driving member 160 to slide along the central post 146 and the pivot axis Y and push the latch 142 to slide from the locking position to the unlocking position against the biasing force of the spring 156. Once the latch 142 is in the unlocking position, the latch 142 can rotate along with the shell portion 132 and the push handle frame 106 relative to the driving member 160 and the shell portion 130 during folding and unfolding of the child stroller apparatus 100. During this rotation, the latch 142 can remain in sliding contact with the driving member 160.

Referring to FIGS. 1-3 and 6, the grip portion 140 can further be assembled with a safety lock 174 for preventing inadvertent operation of the release actuator 158 that would result in accidental unlocking of the latch 142. In conjunction with FIGS. 1-3 and 6, FIGS. 11 and 12 are cross-sectional views illustrating the assembly and operation of the safety lock 174. Referring to FIGS. 1-3, 6, 11 and 12, according to an example of construction, the safety lock 174 can be disposed adjacent to the release actuator 158, and can be assembled with the grip portion 140 for sliding movement generally horizontally and transversally relative to the grip portion 140. The safety lock 174 can include a stop portion 176 inside the grip portion 140, and an actuating portion 178 exposed at least partially on an outer surface (e.g., side surface) of the grip portion 140 for operation. According to an example of construction, the safety lock 174 including the stop portion 176 and the actuating portion 178 may be provided as a unitary part.

Figure 11:
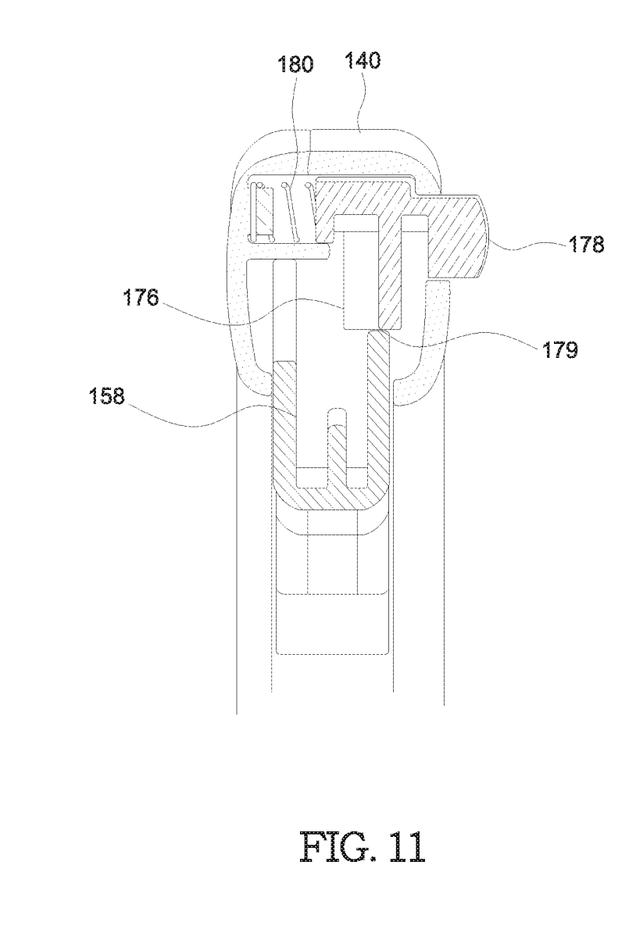
FIGS. 11 and 12 are schematic cross-sectional view illustrating a safety lock disposed adjacent to a grip portion in the child stroller apparatus.
Figure 12:
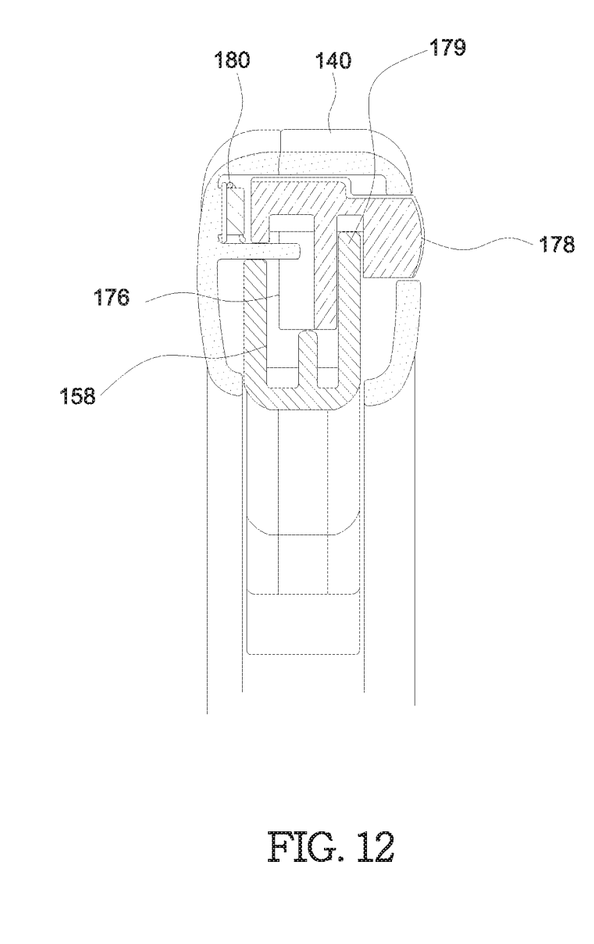

The safety lock 174 can slide relative to the grip portion 140 between a blocking position shown in FIG. 11 and a release position shown in FIG. 12. In the blocking position, the actuating portion 178 can protrude outward on a side surface of the grip portion 140, and the stop portion 176 of the safety lock 174 can engage with a portion 179 of the release actuator 158 to block inward movement of the release actuator 158, whereby the safety lock 174 can prevent the release actuator 158 from rotating for unlocking the child stroller apparatus 100. In the release position, the safety lock 174 is moved inward so that the stop portion 176 can disengage from the portion 179 of the release actuator 158, thereby allowing the release actuator 158 to rotate toward the interior of the grip portion 140 for unlocking the child stroller apparatus 100.

Referring to FIGS. 11 and 12, the hollow interior of the grip portion 140 may further include a spring 180 connected with the safety lock 174. For example, the spring 180 may have two ends respectively connected with the safety lock 174 and an inner sidewall of the grip portion 140. The spring 180 can bias the safety lock 174 toward the blocking position.

When the release actuator 158 is not operated, the spring 180 can bias the safety lock 174 to the blocking position, whereby the safety lock 174 can stop the release actuator 158 and block its displacement toward the interior of the grip portion 140. When the child stroller apparatus 100 is to be folded, a caregiver can grasp the grip portion 140 with one hand, and use the same hand to operate the actuating portion 178 of the safety lock 174 and the release actuator 158 in parallel. As a result, the safety lock 174 can slide from the blocking position to the release position against the biasing force of the spring 180, and the release actuator 158 can rotate toward the interior of the grip portion 140 to urge the latch 142 to unlock like described previously. The child stroller apparatus 100 can be thereby unlocked, and then lifted above a floor surface with the grip portion 140. As the unlocked child stroller apparatus 100 rises, gravity action can facilitate the rotation of the rear leg frame 104 and the push handle frame 106 toward the front leg frame 102 for folding the child stroller apparatus 100.

When the child stroller apparatus 100 is to be used and expanded from the folded state to the unfolded state, the safety lock 174 and the release actuator 158 can be operated like described previously for unlocking the child stroller apparatus 100. The rear leg frame 104 and the push handle frame 106 then can be rotated to unfold the child stroller apparatus 100.

According to an embodiment, the same assembly comprised of the latch 142, the spring 156 and the driving member 160 described previously can be respectively provided on each of the left and right sides of the child stroller apparatus 100, and the release actuator 158 can be connected with the two driving members 160 on the left and right sides via two separate cables 162 better shown in FIGS. 6 and 7. The two cables 162 can include a shorter cable 162 connecting the release actuator 158 with the driving member 160 that is on the same side as the release actuator 158 (as described previously), and a longer cable 162 (shown with phantom lines in FIG. 1) that is routed along the two side segments 102A and the transversal portion 102B of the front leg frame 102 to connect the release actuator 158 with the driving member 160 on the side opposite to the side of the release actuator 158. The two latches 142 and the two driving members 160 can operate in a same way like described previously, and the release actuator 158 is operable to urge the two latches 142 on the left and right sides to unlock in a concurrent manner via the coupling of the two cables 162.

According to an embodiment, the same construction comprised of the grip portion 140, the release actuator 158, the safety lock 174 and the spring 180 described previously may be redundantly provided on each of the left and right sides of the child stroller apparatus 100 for better accessibility.

Advantages of the structures described herein include the ability to provide a child stroller apparatus that is convenient to fold and unfold, and has a safety feature that can prevent accidental folding of the child stroller apparatus. In particular, the child stroller apparatus has a rigid grip portion that is placed adjacent to a central articulation of the child stroller apparatus and is fixedly connected with a rigid side segment of the stroller frame, whereby a caregiver can easily fold the child stroller apparatus with one hand by lifting the child stroller apparatus with the grip portion.

Realization of the child stroller apparatus has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:
1. A child stroller apparatus comprising:
a first side segment fixedly connected with a first shell portion and a grip portion, the first side segment being a part of a front leg frame, the first shell portion and the grip portion being disposed adjacent to each other;
a second side segment fixedly connected with a second shell portion, the second side segment being a part of a push handle frame, the second shell portion being pivotally connected with the first shell portion;
a rear leg frame having a third side segment pivotally connected with the first side segment;
a linking bar respectively connected pivotally with the second side segment and the third side segment;
a latch assembled in a cavity delimited at least partially by the first and second shell portions, the latch being movable between a locking position that prevents relative rotation between the first and second side segments and thereby locks the child stroller apparatus in an unfolded state for use, and an unlocking position for folding and unfolding of the child stroller apparatus; and
a release actuator assembled adjacent to the grip portion and operatively coupled to the latch, the release actuator being operable to cause the latch to move from the locking position to the unlocking position;
wherein the grip portion extends below the first shell portion, and has one end adjacent to a pivot connection between the first side segment and the third side segment.

2. The child stroller apparatus according to claim 1, wherein the grip portion protrudes forward from the first shell portion in the unfolded state.

3. The child stroller apparatus according to claim 1, wherein an outer shape of the grip portion defines at least partially a concavity in which the release actuator is exposed for operation, the release actuator being movable toward a hollow interior of the grip portion to cause the latch to move to the unlocking position.

4. The child stroller apparatus according to claim 1, wherein the grip portion is assembled with a safety lock for preventing inadvertent operation of the release actuator that results in accidental unlocking movement of the latch.

5. The child stroller apparatus according to claim 4, wherein the release actuator is movable relative to the grip portion along a generally vertical plane, and the safety lock is slidable generally horizontally relative to the grip portion.

6. The child stroller apparatus according to claim 4, wherein the safety lock is exposed at least partially on an outer surface of the grip portion.

7. The child stroller apparatus according to claim 1, wherein the first and second shell portions are pivotally connected with each other about a pivot axis, and the latch is assembled for sliding movement along the pivot axis between the locking position and the unlocking position, the latch being respectively engaged with the first and second shell portions in the locking position and disengaged from one of the first and second shell portions in the unlocking position.

8. The child stroller apparatus according to claim 7, wherein the latch includes at least one tooth, and is engageable with the first and second shell portions to lock the child stroller apparatus in the unfolded state and a folded state.

9. The child stroller apparatus according to claim 7, further including a spring disposed around the pivot axis and connected with the latch, the spring biasing the latch toward the locking position.

10. The child stroller apparatus according to claim 7, wherein the latch is disposed adjacent to a driving member that is connected with the release actuator via a cable, the driving member being slidable along the pivot axis to urge the latch to move from the locking position to the unlocking position.

11. The child stroller apparatus according to claim 10, wherein the latch in the unlocking position is rotatable along with the second shell portion and the second side segment relative to the driving member and the first shell portion during folding and unfolding of the child stroller apparatus.

12. The child stroller apparatus according to claim 10, wherein the release actuator is pivotally connected with the grip portion, and the driving member is rotatable about the pivot axis relative to the first shell portion, the release actuator being operable to urge the driving member in rotation so that the driving member contacts and pushes the latch to the unlocking position.

13. The child stroller apparatus according to claim 12, wherein the first shell portion includes a rib in sliding contact with a ramped surface provided on the driving member, the sliding contact between the rib and the ramped surface causing the driving member to slide along the pivot axis and push the latch to the unlocking position as the driving member is drawn in rotation about the pivot axis by the release actuator.

14. The child stroller apparatus according to claim 10, wherein the latch and the driving member are disposed at one of a left and a right side of the child stroller apparatus, and the other one of the left and right side has a second latch and a second driving member assembled in a similar way, the second driving member being connected with the release actuator via a second cable.

15. A child stroller apparatus comprising:
a front leg frame including two first side segments at a left and a right side of the child stroller apparatus, each of the two first side segments being respectively connected fixedly with a first shell portion, at least one of the two first side segments further being fixedly connected with a grip portion;
a push handle frame including two second side segments, each of the two second side segments being respectively connected fixedly with a second shell portion, the second shell portion being pivotally connected with the first shell portion at each of the left and the right side of the child stroller apparatus;
a rear leg frame including two third side segments respectively connected pivotally with the two first side segments;
two linking bars respectively disposed at the left and the right side of the child stroller apparatus, each of the two linking bars being respectively connected pivotally with one second side segment and one third side segment;
two latches respectively provided on the left and right side of the child stroller apparatus, each of the two latches being assembled in a cavity delimited at least partially by one of the two first shell portions and one of the two second shell portions, each of the two latches being movable between a locking position that locks the child stroller apparatus in an unfolded state for use and an unlocking position for folding and unfolding of the child stroller apparatus;
two driving members disposed respectively adjacent to the two latches, the two driving members being movable to respectively urge the two latches to move from the locking position to the unlocking position; and
a release actuator assembled adjacent to the grip portion and respectively connected with the two driving members via two cables, one of the two cables being routed along the two first side segments of the front leg frame, the release actuator being operable to urge the two driving members to concurrently move and push the two latches from the locking position to the unlocking position.

16. The child stroller apparatus according to claim 15, wherein at each of the left and right side, the first shell portion is pivotally connected with the second shell portion about a pivot axis, and each of two latches is assembled for sliding movement along the pivot axis between the locking position and the unlocking position, the latch being engaged with the first and second shell portions in the locking position and disengaged from one of the first and second shell portions in the unlocking position.

17. The child stroller apparatus according to claim 16, wherein the two driving members are rotatable about and slidable along the pivot axis to respectively push the two latches from the locking position to the unlocking position.

18. The child stroller apparatus according to claim 15, wherein the two latches in the unlocking position are rotatable along with the second shell portions and the push handle frame relative to the two driving members and the first shell portions during folding and unfolding of the child stroller apparatus.

19. The child stroller apparatus according to claim 15, wherein the grip portion protrudes from one of the first shell portions.

20. A child stroller apparatus comprising:
a first side segment fixedly connected with a first shell portion and a grip portion, the first shell portion and the grip portion being disposed adjacent to each other;
a second side segment fixedly connected with a second shell portion, the second shell portion being pivotally connected with the first shell portion;
a latch assembled in a cavity delimited at least partially by the first and second shell portions, the latch being movable between a locking position that prevents relative rotation between the first and second side segments and thereby locks the child stroller apparatus in an unfolded state for use, and an unlocking position for folding and unfolding of the child stroller apparatus; and a release actuator assembled adjacent to the grip portion and operatively coupled to the latch, the release actuator being operable to cause the latch to move from the locking position to the unlocking position;

wherein an outer shape of the grip portion defines at least partially a concavity in which the release actuator is exposed for operation, the release actuator being movable toward a hollow interior of the grip portion to cause the latch to move to the unlocking position.

21. The child stroller apparatus according to claim 20, wherein the grip portion protrudes forward from the first shell portion in the unfolded state.

22. A child stroller apparatus comprising:

a first side segment fixedly connected with a first shell portion and a grip portion, the first shell portion and the grip portion being disposed adjacent to each other;

a second side segment fixedly connected with a second shell portion, the second shell portion being pivotally connected with the first shell portion;

a latch assembled in a cavity delimited at least partially by the first and second shell portions, the latch being movable between a locking position that prevents relative rotation between the first and second side segments and thereby locks the child stroller apparatus in an unfolded state for use, and an unlocking position for folding and unfolding of the child stroller apparatus; and a release actuator assembled adjacent to the grip portion and operatively coupled to the latch, the release actuator being operable to cause the latch to move from the locking position to the unlocking position;

wherein the grip portion is assembled with a safety lock for preventing inadvertent operation of the release actuator that results in accidental unlocking movement of the latch, the safety lock being exposed at least partially on an outer surface of the grip portion.

23. The child stroller apparatus according to claim 22, wherein the release actuator is movable relative to the grip portion along a generally vertical plane, and the safety lock is slidable generally horizontally relative to the grip portion.

24. A child stroller apparatus comprising:

a first side segment fixedly connected with a first shell portion and a grip portion, wherein the first shell portion and the grip portion are respectively connected fixedly with a sleeve, the grip portion having two ends respectively connected with the first shell portion and the sleeve, and the first side segment being fastened through the sleeve;

a second side segment fixedly connected with a second shell portion, the second shell portion being pivotally connected with the first shell portion;

a latch assembled in a cavity delimited at least partially by the first and second shell portions, the latch being movable between a locking position that prevents relative rotation between the first and second side segments and thereby locks the child stroller apparatus in an unfolded state for use, and an unlocking position for folding and unfolding of the child stroller apparatus; and a release actuator assembled adjacent to the grip portion and operatively coupled to the latch, the release actuator being operable to cause the latch to move from the locking position to the unlocking position.

25. The child stroller apparatus according to claim 24, wherein an outer shape of the grip portion defines at least partially a concavity in which the release actuator is exposed for operation, the release actuator being movable toward a hollow interior of the grip portion to cause the latch to move to the unlocking position.

* * * * *